United States Patent
Jonsson et al.

(10) Patent No.: US 11,756,701 B2
(45) Date of Patent: Sep. 12, 2023

(54) CABLE HAVING A COATING LAYER MADE OF A RECYCLED POLYMER MATERIAL

(71) Applicant: PRYSMIAN S.p.A., Milan (IT)

(72) Inventors: Gustaf Jonsson, Dals Långed (SE); Kristoffer Berglund, Borås (SE)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 17/684,482

(22) Filed: Mar. 2, 2022

(65) Prior Publication Data

US 2022/0293296 A1  Sep. 15, 2022

(30) Foreign Application Priority Data

Mar. 9, 2021  (IT) .................. 102021000005426

(51) Int. Cl.
*H01B 3/04* (2006.01)
*H01B 3/44* (2006.01)
*H01B 11/22* (2006.01)

(52) U.S. Cl.
CPC .............. *H01B 3/441* (2013.01); *H01B 3/446* (2013.01); *H01B 11/22* (2013.01)

(58) Field of Classification Search
CPC ... H01B 3/18; H01B 3/24; H01B 3/28; H01B 3/30; H01B 3/441; H01B 3/446; H01B 7/02; H01B 7/0275; H01B 7/0216; H01B 7/18; H01B 7/1875; H01B 11/22; H01B 7/00
USPC ....... 174/110 R–110 N, 113 R, 120 R–122 R
See application file for complete search history.

(56) References Cited

U.S. PATENT DOCUMENTS

| | | | | |
|---|---|---|---|---|
| 5,030,662 A | * | 7/1991 | Banerjie | C08L 23/0876 521/134 |
| 2005/0014902 A1 | * | 1/2005 | McMahon | C08F 255/04 525/242 |
| 2008/0304797 A1 | * | 12/2008 | Castellani | C08L 23/06 385/100 |
| 2009/0202828 A1 | * | 8/2009 | Pelizzoni | C09D 123/06 524/378 |
| 2014/0030520 A1 | * | 1/2014 | Nakamura | H01B 7/295 524/436 |

FOREIGN PATENT DOCUMENTS

| | | |
|---|---|---|
| CN | 105086076 A | 11/2015 |
| CN | 105778234 A | 7/2016 |
| EP | 1676283 A1 | 7/2006 |
| WO | WO-2006000244 A1 | 1/2006 |

OTHER PUBLICATIONS

Search Report and Written Opinion dated Dec. 9, 2021 in Italian Patent Application No 102021000005426.

* cited by examiner

Primary Examiner — William H. Mayo, III
(74) Attorney, Agent, or Firm — Element IP, PLC

(57) ABSTRACT

A cable contains a core including a transmissive element and a coating layer made of a coating material. The coating material contains, with respect to the total weight of polymeric materials present in the composition, (i) 70% to 95% by weight of a recycled linear low density polyethylene (r-LLDPE); and (ii) 5 to 30% by weight of an ethylene-vinyl acetate copolymer (EVA). The EVA may be added to the r-LLDPE or, alternatively, be already contained in the r-LLDPE as a result of previous LLDPE use. The cable may further contain a skin layer placed around and in direct contact with the coating layer based on r-LLDPE.

15 Claims, 2 Drawing Sheets

CABLE HAVING A COATING LAYER MADE OF A RECYCLED POLYMER MATERIAL

BACKGROUND OF THE INVENTION

Field of the Invention

Figure 1:
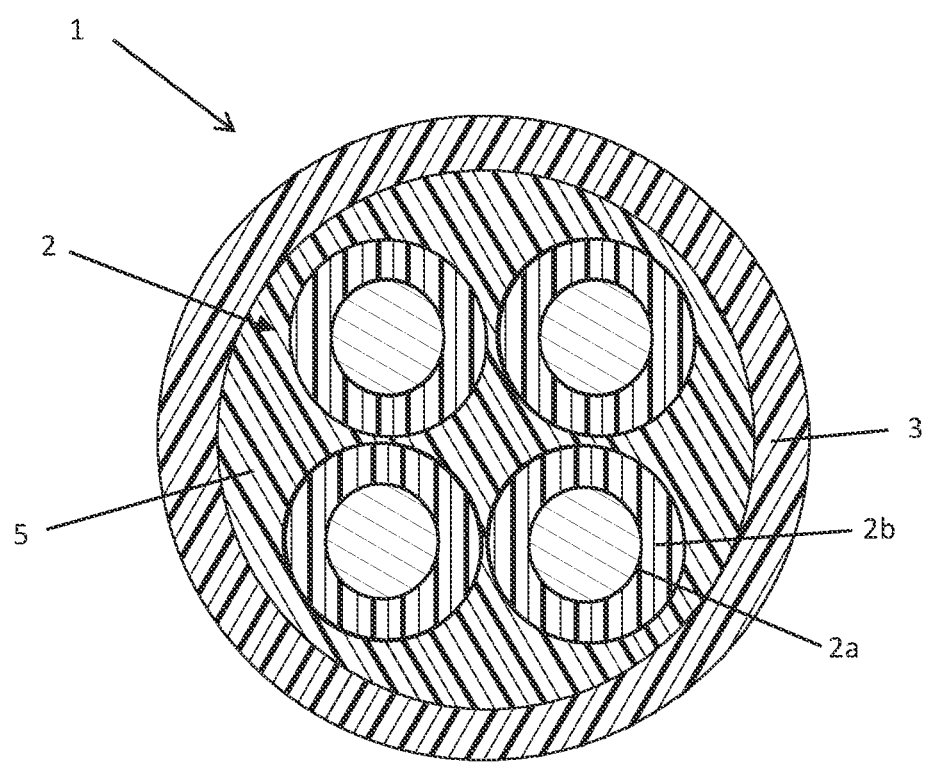

The present disclosure relates to a cable having a coating layer made of a recycled polymer material. More particularly, the present disclosure relates to a cable including at least one core comprising at least one transmissive element and at least one coating layer, said coating layer being made of a recycled polymer material comprising at least one polyethylene obtained from a waste material.

Description of the Related Art

The possibility of using polymer materials obtained from wastes for the manufacturing of new products is a problem of increasing importance for environmental sustainability and costs reduction. In the field of cables, several efforts have been made to use recycled polymer materials, especially ethylene polymers obtained from waste materials, to produce cable coating layers, in particular cable sheaths (or jackets).

US 2008/0304797 relates to a cable comprising at least one core comprising a coating layer made from a coating material, comprising a first polyethylene obtained from a waste material; and a second polyethylene having a density higher than 0.940 g/cm$^3$. The first polyethylene may be selected from low density polyethylene (LDPE), linear low density polyethylene (LLDPE), very low density polyethylene (VLDPE), or mixtures thereof. The first polyethylene can be present in the coating material in an amount of between 30 wt % and 90 wt % with respect to the total weight of the coating material. In order to protect the coating material from UV degradation the coating material may further comprise carbon black, preferably in an amount of between 2 wt % and 5 wt % with respect to the total weight of the coating material. Other conventional additives may be added to the coating material, e.g. glass particles, glass fibers, calcined clay, talc, or mixtures thereof.

In the article by Hamim, F. A. R. et al, (2016), *J. Phys. Sci.*, 27(2), 23-39, recycled high density polyethylene (RHDPE)/ethylene vinyl acetate (EVA) blends with different blend compositions and compatibilisers are disclosed. The compatibilisation of RHDPE/EVA blends was enhanced by the addition of 6 phr of polyethylene-grafted-maleic anhydride (PE-g-MAH) and caprolactam-maleic anhydride (CL-MAH). All blends significantly decreased in tensile strength with increasing content of EVA. This was due to the presence of EVA which influenced the crystalline structure of RHDPE due to EVA amorphous characteristic. Compatibilised blends with PE-g-MAH reveal higher tensile strength than uncompatibilised RHDPE/EVA blends.

In the article by Czarnecka-Komorowska D. et al, *Advances in Science and Technology Research Journal*, Vol. 12, No. 3, September 2018, pages 134-142 the results of the investigation into the properties of films made from recycled polyethylenes are presented. Reprocessing of LDPE and LLDPE originating from packaging materials brings to insignificant degree of degradation of the blends and recycled rLDPE or rLLDPE are characterized by usage properties similar to virgin polyethylenes. A significant increase of tensile properties like strength and elongation at break is observed for recycled LDPE. When the recycled material is LLDPE, the opposite behaviour was observed.

CN103965537 relates to a self-crosslinkable composite polyethylene cable material which comprises a recycled material of low density polyethylene (LDPE), a recycled material of linear low density polyethylene (LLDPE), a recycled material of high density polyethylene (HDPE), a polyethylene wax, a heat stabilizer, a cold resistant agent, a silane.

BRIEF SUMMARY OF THE INVENTION

The Applicant has noticed that recycled polymer materials usually provide cable coating layers having poor mechanical properties with respect to those obtained from virgin polymer materials. Moreover, such coating layers may have poor appearance and/or a sticky surface. These problems may be solved by mixing the recycled polymer materials with a virgin one, the amount of the virgin material being usually at least 10%w. This, of course, reduces environmental and economic advantages with respect to the use of recycled polymers alone. Also, some admixtures recycled/virgin polymer could not solve the problems or give rise to new ones.

The Applicant has faced the technical problem of providing recycled polymer materials useful for producing cable coating layers, specifically cable jackets, wherein the recycled materials is by far the prevailing or even the sole polymer material present in the coating layer, which has satisfactory mechanical properties, particularly tensile and elongation at break, and good surface appearance.

The Applicant has found that the above technical problem and others can be solved by providing a cable with a coating layer made of a composition comprising a recycled linear low density polyethylene (r-LLDPE) in an amount of from 70% to 95% by weight, an ethylene-vinyl acetate copolymer (EVA) in an amount of from 5 to 30% by weight, the weight percentages being expressed with respect to the total weight of polymeric materials present in the composition.

BRIEF DESCRIPTION OF THE DRAWING(S)

Figure 2:
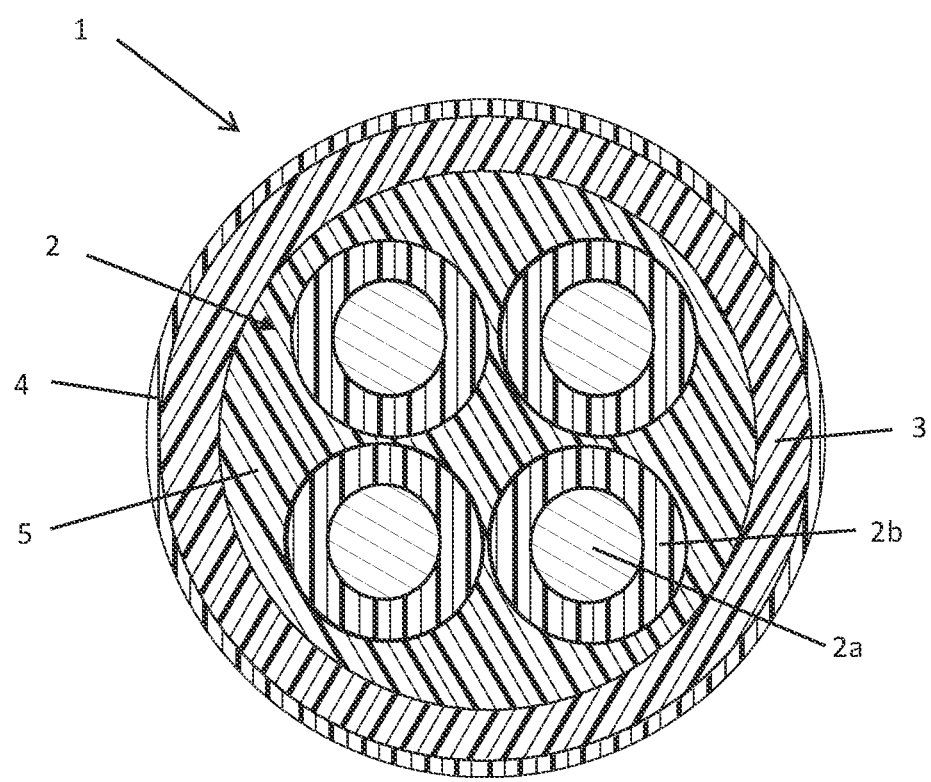

FIG. 1 shows a sectional view of an energy cable according to an embodiment of the present disclosure; and
FIG. 2 shows a sectional view of an energy cable according to another embodiment of the present disclosure.

DETAILED DESCRIPTION OF THE INVENTION

According to a first aspect, the present disclosure relates to a cable comprising: a core comprising a transmissive element, and a coating layer made of a coating material, said coating material comprising:
(i) a recycled linear low density polyethylene (r-LLDPE) in an amount of from 70% to 95% by weight, for example from 80% to 90% by weight; and
(ii) an ethylene-vinyl acetate copolymer (EVA) in an amount of from 5 to 30% by weight, for example from 10% to 20% by weight;
the weight percentages being expressed with respect to the total weight of polymeric materials present in the composition.

For the purposes of the present description and of the subsequent claims, the term "core" of a cable is used to indicate a semi-finished structure comprising a transmissive element, such as an electrical energy transmissive element, an optical signal transmissive element or an element which transmits both electrical energy and optical signals, and at least one electrical insulation or, respectively, at least one containment element (such as, for example, a tube, a sheath, a microsheath or a grooved core), or at least two elements, one of which is an electrical insulation element and one is a containment element, arranged at a radially outer position with respect to the relevant transmissive element.

For the purposes of the present description and of the subsequent claims, the term "electrical energy transmissive element" is used to indicate any element capable of carrying electrical energy such as, for example, a metallic conductor element. As an illustrative example, if we consider a cable for transporting or distributing medium/high voltage electrical energy (where medium voltage indicates a voltage comprised between about 1 kV and about 30 kV, whereas high voltage indicates a voltage greater than about 30 kV), the "core" of the cable further comprises at least one of an inner semiconductive coating layer arranged at a radially outer position with respect to the conductor element, or an outer semiconductive coating layer arranged at a radially outer position with respect to the electrical insulation element. Also, a metallic screen arranged at a radially outer position with respect to said outer semiconductive coating layer is generally provided.

For the purposes of the present description and of the subsequent claims, the term "optical signal transmissive element" is used to indicate any transmission element comprising at least one optical fibre. Therefore, such a term identifies both a single optical fibre and a plurality of optical fibres, optionally grouped together to form a bundle of optical fibres or arranged parallel to each other and coated with a common coating to form a ribbon of optical fibres. As an illustrative example, if we consider an optical cable, the "core" of the cable may further comprise a water blocking/absorbing material, e.g. a gel, embedding the transmissive element within a containment layer.

For the purposes of the present description and of the subsequent claims, the term "mixed electro-optical transmissive element" is used to indicate any element capable of transmitting both electrical energy and optical signals in accordance with the abovementioned definitions.

For the purposes of the present description and of the subsequent claims, the term "coating layer" means any coating deposited around the transmissive element of a cable for protective purposes, e.g. for preventing the damages of the transmission element due to mechanical stresses during manufacturing, installation and use; such coating layer may also be identified as "sheath" or "jacket".

The present disclosure also refers to cables provided with a plurality of cores as defined above, known in the field with the terms "bipolar cable", "tripolar cable" and "multipolar cable", depending on the number of cores incorporated therein (in the mentioned cases in number of two, three, or greater, respectively).

In accordance with the abovementioned definitions, the present disclosure refers to cables provided with one or more cores of any type. In other words, the present disclosure refers to unipolar or multipolar cables, of electrical type for transporting or distributing electrical energy, or of the optical type comprising at least one optical fibre, or of the mixed energy/telecommunications type.

For the purpose of the present description and of the claims that follow, except where otherwise indicated, all numbers expressing amounts, quantities, percentages, and so forth, are to be understood as being modified in all instances by the term "about". Moreover, all ranges include any combination of the maximum and minimum points disclosed and include any intermediate ranges therein, which may or may not be specifically enumerated herein.

The present disclosure, in at least one of its aspects, can be implemented according to one or more of the present embodiments, optionally combined together.

For the purpose of the present description and of the appended claims, the words "a" or "an" should be read to include one or at least one and the singular also includes the plural unless it is obvious that it is meant otherwise. This is done merely for convenience and to give a general sense of the disclosure.

For the purposes of the present description and of the subsequent claims, the amounts of the various components of the composition are expressed, unless otherwise specified, as % by weight with respect to the total weight of polymeric materials present in the composition.

As regards the r-LLDPE (recycled linear low density polyethylene), it may be a LLDPE obtained by recycling articles comprising or essentially consisting of LLDPE, such as mulching films used in agriculture or for packaging films. In an embodiment, the r-LLDPE may have a density of from 0.850 to 0.926 g/cm$^3$, measured according to standard method ASTM D792-00. As well known in the field, LLDPE identifies a class of ethylene copolymers having short branchings, obtained by copolymerization of ethylene with small amounts of an alpha-olefin $C_3$-$C_{12}$, for example 1-butene, 1-hexene or 1-octene. LLDPE can be produced by a low-pressure copolymerization process in the presence of a Ziegler-Natta catalyst, a chromium catalyst or a metallocene catalyst. The alpha-olefin $C_3$-$C_{12}$ can be contained in the copolymer in an amount of from 1 to 15% by mole.

In an embodiment, the r-LLDPE has a melt flow index (MFI; a.k.a. melt flow rate, MFR, or melt index) of from 0.8 to 10 g/10 min (190° C., 2.16 kg according to ASTM D1238-04 or ISO 1133-00).

As regards the ethylene-vinyl acetate copolymer (EVA), it is usually produced by high pressure copolymerization of ethylene with vinylacetate. The amount of vinylacetate in the EVA can be from 10% to 40% by weight, for example from 15% to 30% by weight.

The EVA may be added to the r-LLDPE or, alternatively, be already contained in the r-LLDPE as a result of the previous LLDPE use. In the latter case EVA is recycled as well. The amount of EVA already contained in an r-LLDPE (recycled EVA) can be ascertained by FT-IR (Fourier transform infrared spectroscopy) analysis.

The composition of the present coating layer may contain a virgin or an additional recycled polyethylene homopolymer or copolymer in an amount of 5 to 50% by weight. The virgin polyethylene may be, e.g., LLDPE or HDPE; the additional recycled polyethylene may be HDPE. The addition of LLDPE may be useful to improve flexibility of the present composition, while the addition of HDPE, either virgin or recycled, may be useful to improve hardness of the present composition.

In an embodiment, the composition of the present coating layer may further comprise a detackifier in an amount of from 1 to 25% by weight, for example from 1 to 8% by weight.

As regards the detackifier, it is may be at least one of talc, kaolin, calcium carbonate, chalk, stearic acid and stearates, e.g. zinc, aluminium, calcium, magnesium, sodium stearates. The addition of the detackifier may be aimed to avoid sticking of the composition, both when it is reduced into a subdivided form, such as granules or beads, to be processed, or when it is applied onto the cable core.

The composition may contain other additives, such as: antioxidants, flame retardants, light or UV stabilizers, processing aids, lubricants, pigments, thermal stabilizers, or mixtures thereof.

In an embodiment, the composition may contain carbon black in an amount of from 0.5% to 10% by weight, for example from 1% to 5% by weight. Carbon black may be useful to prevent UV degradation of the polymeric material or as a pigment to fulfil standard requirements.

The coating layer according to the present disclosure may be produced according to known extrusion techniques. In an embodiment, the composition is fed in a subdivided form to an extruder provided with an extrusion head where the cable core is conveyed. The composition is melted and mixed inside the extruder, optionally filtered and then deposited around the cable core. The so covered cable is cooled and collected on a reel.

The cable according to the present disclosure may further comprise a skin layer placed around and in direct contact with the coating layer based on r-LLDPE. The skin layer may be made of virgin polyethylene and is aimed to improve the surface appearance. Also, the skin layer may be used when the coating layer is somewhat still sticky. In case the skin layer is made of virgin HDPE, this can provide the coating layer with the hardness sought in some applications.

The skin layer may have a thickness of from 1 to 20% of the thickness of the coating layer.

The coating layer of the cable of the present disclosure may be the outer sheath (a.k.a. jacket). It may be the outermost cable layer, unless a skin layer is present.

Further characteristics and advantages will be more apparent from the following description of some embodiments given as a way of an example with reference to FIG. 1 and FIG. 2.

FIG. 1 shows a low voltage (LV) cable 1 comprising four cable cores 2. Each cable core 2 comprises an electric conductor 2a made of a metal such as copper or aluminium or composite thereof, in the form of bundled or stranded wires or of a single rod. Each electric conductor 2a is surrounded by an insulating layer 2b. The insulating layer 2b can be made of a polymer material such as polyethylene.

The four cable cores 2 are stranded together and at least partially embedded in a filler 5 made of a polymeric material. The filler is surrounded by a sheath or jacket 3 made of a polymeric composition according to the present disclosure.

The cable of FIG. 2 differs from that of FIG. 1 in that the jacket 3 is surrounded by a skin layer 4 according to the present disclosure.

EXAMPLE 1

The following polymer materials were tested:
M1 (reference material): virgin LLDPE having a density of 0.923 g/cm$^3$ and added with 2.5 wt % carbon black (final density: 0.936 g/cm$^3$; MFI=0.85 g/10 min);
M2: recycled LLDPE from mulching films containing 5.6 wt % of EVA, density=0.969 g/cm$^3$;
M3 (comparative): 65-75 wt % of recycled low density polyethylene (LDPE)+25-35 wt % of recycled LLDPE+less than 5 wt % of recycled polypropylene (PP), MFI=0.8-1.1 g/min, density=0.920-0.930 g/cm$^3$;
M4 (comparative): recycled LDPE containing less than 40 wt % of recycled LLDPE, MFI=0.7-1.0 g/min, density=0.920-0.935 g/cm$^3$;
M5 (comparative): recycled high density polyethylene (HDPE), MFI=0.5 g/min, density=0.95 g/cm$^3$;
M6 (comparative): recycled high density polyethylene (HDPE), MFI=0.2 g/min, density=0.96 g/cm$^3$;
M7: 70 wt % of M2+30 wt % of M1;
M8: M2 added with carbon black (2.5 wt %);
M9: M2 added with chalk (5.0 wt %)+carbon black (2.5 wt %);
M10: M2 added with talc (2.5 wt %)+carbon black (2.5 wt %);
M11 (comparative): M4 added with carbon black (2.5 wt %);
M12: M2 added with talc (2.5 wt %).

Materials M1, M7, M8, M9, M10 and M12 are according to the present disclosure. The above materials were tested as follows.

Preparation of Films.

The granules of the tested materials were placed in batches of about 150-250 ml between the rolls of a Schwabenthan laboratory testing roll mill. The roll distance was smaller than 3 mm. The obtained film was partially cut and folded over itself before going back into the mill in order to make it the most homogeneous possible. Then, the roll distance was increased to an extent so as to take out an even film from the roll mill. The film was placed to cool before it was put into a polymer press to homogenize the polymer and to create a sample piece of an even width.

Preparation of Specimens for Testing.

The polymer film was cut to fit into metal templates of 1 mm thickness. The film inside the template was put in between two polyester covers to prevent adhesion between polymer and metal. Finally, the covered film was put between two flat metal plates before being put into the press. The press had two compartments, one lower and one upper. Into each one separately, the samples were placed. The compartments were heated to 180° C. throughout the first 10 min, then cooling was initiated. The pressures were set to 1 bar for 5 minutes, to 10 bar for 10 minutes, then the last 5 minutes were under cooling. After 15 min inside the press, the samples were heated, pressed and cooled. The plates, covers and metal templates were removed, and the samples were stented into dumbbells using a wrench.

Tensile Strength (TS) and Elongation at Break (EB) Tests.

The dumbbell specimens were subjected to tensile testing according Swedish standards SS 424 14 18 (2007) and SS-EN 60811-100 (2014), using an initial stretching speed of 25 mm/min. The test was carried out on 5 samples before and after ageing.

Ageing was carried out by putting five specimens of each material in an oven at 100° C. for 240 hours. The specimens were taken out of the oven, maintained at room temperature for at least 16 hours and then tensile properties were assessed again as described above.

The results are reported in Table 1.

TABLE 1

| Sample | TS (MPa) before ageing | TS (MPa) after ageing | EB (%) before ageing | EB (%) after ageing |
|---|---|---|---|---|
| M1* | 27.9 | 25.8 | 808.7 | 828.0 |
| M2 | 28.9 | 26.5 | 828.9 | 813.0 |
| M3* | 19.9 | 17.5 | 727.2 | 730.4 |
| M4* | 24.0 | 24.3 | 693.0 | 747.0 |
| M5* | 26.1 | 26.3 | 880.5 | 453.8 |
| M6* | 32.3 | 33.5 | 966.7 | 1010.3 |
| M7 | 27.8 | 25.8 | 835.4 | 836.9 |
| M8 | 27.6 | — | 828.4 | — |
| M9 | 25.2 | 24.6 | 788 | 833.9 |
| M10 | 28.7 | 24.8 | 830 | 840.3 |
| M11* | 26.3 | 22.5 | 780 | 780.1 |

*comparative

As from Table 1, the compositions according to the present disclosure (M2, M7, M8, M9 and M10) showed mechanical properties comparable to those of a virgin polymer composition (M1) and better, both before and after ageing, than recycled polymer-based compositions comprising recycled LLDPE (M3, M4) but free from EVA. The compositions comprising recycled HDPE (M5, M6) showed a better performance by virtue of the higher density of that polyethylene.

Low Temperature Testing.

Three specimens of each material were put into a cold chamber at −20° C. for at least 16 hours. Then the specimens were brought to room temperature and they were caught in a wrench and fixed at both ends. The distance between the ends was $l_0$. By using a crank shaft rotated of one turn every five seconds, an approximate elongation speed of 20 mm/min was applied.

The elongation at break (EB) of the samples were evaluated as in Example 1. The results are reported in Table 2.

TABLE 2

| Sample | EB (%) after cold treatment |
|---|---|
| M2 | >200 |
| M4* | >200 |
| M5* | 25 |
| M6* | 70.8 |

While the composition according to the present disclosure (M2) maintained suitable mechanical properties after cold treatment, the ones comprising recycled HDPE (M5, M6) had a remarkable drop making their use for a cable sheath questionable.

The composition M12, having mechanical features similar to those of composition M10, was also tested for environmental stress crack resistance (ESCR) according to ASTM D1693-13 using 100% Igepal. No imperfections were observed after more than 1,000 hours.

EXAMPLE 2

4000 m of N1XE-AS 4G95 0.6/1 kV cables were produced having a jacket made from a composition according to the present disclosure or from a comparative one, selected from those of Example 1. Some cables were provided with a skin of virgin polymeric material, having a thickness of 10% of the thickness of the outer sheath.

Tensile and elongation at break tests were performed on samples of the outer sheath. In particular, tests before and after ageing at 100° C. for 240 hours were carried out on samples of the outer sheath detached from the cable.

The results are reported in Table 3.

TABLE 3

| Sample | M4* | M12 | M12 + LLDPE skin | M12 + MDPE° skin | M12 + HDPE°° skin |
|---|---|---|---|---|---|
| TS (MPa) before ageing | 19 | 30.7 | 32 | 31.4 | 31.2 |
| TS (MPa) after ageing | — | 26.2 | 29.4 | 28.2 | 27.0 |
| EB (%) before ageing | 633 | 785 | 784 | 794 | 820 |
| EB (%) after ageing | — | 773 | 817 | 793 | 822 |

°Medium density polyethylene having a density of 0.936 g/cm³ and added with 2.5% carbon black (final density: 0.948 g/cm³; MFI = 0.7 g/10 min);
°°High density polyethylene (density: 0.950 g/cm³; MFI = 0.3 g/10 min)

While the cable outer sheath made with a comparative composition (M4) had, after extrusion, mechanical features unsuitable for a cable even before ageing, the cable outer sheaths made with a composition of the present disclosure had suitable mechanical features after ageing too. The presence of skin layer made of virgin polyethylene material did not substantially change the mechanical features.

The invention claimed is:

1. A cable comprising: a core comprising a transmissive element, and a coating layer made of a coating material, said coating material comprising:
   (i) a recycled linear low density polyethylene in an amount of from 70% to 95% by weight; and
   (ii) a recycled ethylene-vinyl acetate copolymer in an amount of from 5 to 30% by weight;
   the weight percentages being expressed with respect to a total weight of polymeric materials present in the coating material.

2. The cable according to claim 1, wherein the coating material comprises the recycled linear low density polyethylene in an amount of from 80% to 90% by weight with respect to the total weight of polymeric materials present in the coating material.

3. The cable according to claim 1, wherein the coating material comprises the recycled ethylene-vinyl acetate copolymer in an amount of 10% to 20% by weight with respect to the total weight of polymeric materials present in the coating material.

4. The cable according to claim 1, wherein the coating material further comprises a virgin polyethylene homopolymer or copolymer in an amount of 5 to 50% by weight with respect to the total weight of polymeric materials present in the coating material.

5. The cable according to claim 4, wherein the virgin polyethylene homopolymer or copolymer is selected from linear low density polyethylene and high density polyethylene.

6. The cable according to claim 1, wherein the coating material further comprises an additional recycled polyethylene homopolymer or copolymer in an amount of 5 to 50% by weight with respect to the total weight of polymeric materials present in the coating material.

7. The cable according to claim 6, wherein the additional recycled polyethylene homopolymer or copolymer is recycled high density polyethylene.

8. The cable according to claim 1, wherein the coating material further comprises a detackifier in an amount of from 1 to 25% by weight with respect to the total weight of polymeric materials present in the coating material.

9. The cable according to claim 8, wherein the detackifier is in an amount of from 1 to 8% by weight with respect to the total weight of polymeric materials present in the coating material.

10. The cable according to claim 8, wherein the detackifier is at least one of talc, kaolin, calcium carbonate, chalk, stearic acid and a stearate.

11. The cable according to claim 1, wherein the coating material further comprises carbon black.

12. The cable according to claim 11, wherein the carbon black is in an amount of from 0.5% to 10% by weight with respect to the total weight of polymeric materials present in the coating material.

13. The cable according to claim 1, further comprising a skin layer around and in direct contact with the coating layer.

14. The cable according to claim 13, wherein the skin layer is made of a virgin polyethylene.

15. The cable according to claim 13, wherein the skin layer has a thickness of from 1 to 20% of the thickness of the coating layer.

\* \* \* \* \*